United States Patent
Zhang et al.

(10) Patent No.: US 10,970,830 B2
(45) Date of Patent: Apr. 6, 2021

(54) IMAGE STYLE CONVERSION METHOD, APPARATUS AND DEVICE

(71) Applicant: BOE TECHNOLOGY GROUP CO., LTD., Beijing (CN)

(72) Inventors: Lijie Zhang, Beijing (CN); Hanwen Liu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 42 days.

(21) Appl. No.: 16/421,923

(22) Filed: May 24, 2019

(65) Prior Publication Data

US 2020/0134797 A1    Apr. 30, 2020

(30) Foreign Application Priority Data

Oct. 31, 2018 (CN) .......................... 201811291053.8

(51) Int. Cl.
| | |
|---|---|
| G06T 5/50 | (2006.01) |
| G06K 9/62 | (2006.01) |
| G06T 5/00 | (2006.01) |
| H04N 1/60 | (2006.01) |

(52) U.S. Cl.
CPC .............. G06T 5/50 (2013.01); G06K 9/6256 (2013.01); G06T 5/009 (2013.01); H04N 1/6005 (2013.01); H04N 1/6008 (2013.01)

(58) Field of Classification Search
None
See application file for complete search history.

(56) References Cited

U.S. PATENT DOCUMENTS

| | | | | |
|---|---|---|---|---|
| 2016/0212373 | A1* | 7/2016 | Aharon | H04N 19/513 |
| 2018/0211157 | A1* | 7/2018 | Liu | G06T 3/4046 |

FOREIGN PATENT DOCUMENTS

| | | |
|---|---|---|
| CN | 106709532 A | 5/2017 |
| CN | 108537776 A | 9/2018 |
| CN | 108564127 A | 9/2018 |

OTHER PUBLICATIONS

Effect Of Image Colourspace On Performance Of Convolution Neural Networks. Reddy et al (Year: 2017).*
Convolution | Depthwise Separable Convolution, Group Convolution, Dilated Convolution, Transposed Convolution (Deconvolution). CSDN (Year: 2018).*
Multimodal Transfer: A Hierarchical Deep Convolutional Neural Network for Fast Artistic Style Transfer. Wang et al. (Year: 2017).*
(Continued)

*Primary Examiner* — Delomia L Gilliard
(74) *Attorney, Agent, or Firm* — The Webb Law Firm

(57) ABSTRACT

The present disclosure relates to a method, an apparatus and a device for converting a style of an image, wherein the method comprises: acquiring a luminance component (Y) and chrominance components (U, V) in a YUV space of an image to be processed; performing a group convolution processing on the luminance component (Y) and the chrominance components (U, V) in the YUV space of the image to be processed to obtain content features and style features of the image to be processed; and performing a fusion processing on the content features, the style features and target style features of the image to be processed to convert the image to be processed into an image of a target style.

16 Claims, 6 Drawing Sheets

--- performing the fusion processing on the content features, the style features and the target style features of the image to be processed to generate a luminance component (Y) and chrominance components (U, V) in the YUV space of the image to be processed in the target style — 401 determining, according to the luminance component (Y) and the chrominance components (U, V) in the YUV space of the image to be processed in the target style, components of respective color channels in an RGB space of the image of the target style — 402 outputting, according to the components of the respective color channels in the RGB space of the image of the target style, the image of the target style converted from the image to be processed — 403

(56) References Cited

OTHER PUBLICATIONS

Convolution, Depthwise Separable Convolution, Group Convolution: Dilated Convolution, Transposed Convolution (Deconvolution): https://blog.csdn.net/u01426298/article/details/80853553.
First Office Action for CN Appl. No. 201811291053.8, dated Apr. 17, 2020.
Reddy K, et al.: "Effect of Image Colourspace on Performance of Convolution Neural Networks", 2017 2nd IEEE International Conference on Recent Trends in Electronics, Information & Communication Technology (RTEICT), May 19-20, 2017, India.
Wang X, et al: "Multimodal Transfer: A Hierarchical Deep Convolutional Neural Network for Fast Artistic Style Transfer", 2017 IEEE Conference on Computer Vision and Pattern Recognition, 7178-7186.

* cited by examiner

IMAGE STYLE CONVERSION METHOD, APPARATUS AND DEVICE

CROSS REFERENCE TO RELATED APPLICATIONS

This application claims the priority right of Chinese patent application No. 201811291053.8 as filed on Oct. 31, 2018, the disclosure of which is incorporated herein in its entirety by reference.

TECHNICAL FIELD

The present disclosure relates to a method, an apparatus and a device for converting a style of an image.

BACKGROUND

Performing an image processing by using deep neural networks is a technology that has emerged with the development of deep learning technology. However, image processing systems in the related art have poor flexibility and slow speed of the image processing. Therefore, how to improve the flexibility and the processing speed of the image processing systems has become an urgent problem to be solved.

SUMMARY

The present disclosure provides a method, an apparatus and a device for converting a style of an image.

Embodiments of the present disclosure provide a method for converting a style of an image, the method comprising: acquiring a luminance component (Y) and chrominance components (U, V) in a YUV space of an image to be processed; performing a group convolution processing on the luminance component (Y) and the chrominance components (U, V) in the YUV space of the image to be processed to obtain content features and style features of the image to be processed; and performing a fusion processing on the content features, the style features and target style features of the image to be processed to convert the image to be processed into an image of a target style.

Other embodiments of the present disclosure provide an apparatus for converting a style of an image, the apparatus comprising: a first acquiring circuit for acquiring a luminance component (Y) and chrominance components (U, V) in a YUV space of an image to be processed; a second acquiring circuit for performing a group convolution processing on the luminance component (Y) and the chrominance components (U, V) in the YUV space of the image to be processed to obtain content features and style features of the image to be processed; and a fusion processing circuit for performing a fusion processing on the content features, the style features and target style features of the image to be processed to convert the image to be processed into an image of a target style.

Further embodiments of the present disclosure provide a computer device, the computer device comprising: a memory; and a processor, wherein the memory is configured to a store computer program executable on the processor, the computer program, when executed by the processor, causes the processor to perform operations of: acquiring a luminance component (Y) and chrominance components (U, V) in a YUV space of an image to be processed; performing a group convolution processing on the luminance component (Y) and the chrominance components (U, V) in the YUV space of the image to be processed to obtain content features and style features of the image to be processed; and performing a fusion processing on the content features, the style features and target style features of the image to be processed to convert the image to be processed into an image of a target style.

A further embodiment of the present disclosure provides a computer-readable storage medium on which a computer program is stored, which when executed by a processor, implements the image style conversion method of the embodiment of the first aspect of the present disclosure.

Further embodiments of the present disclosure provide a computer program product comprising instructions, wherein the instructions, when executed by a processor, causes the processor to perform operations of: acquiring a luminance component (Y) and chrominance components (U, V) in a YUV space of an image to be processed; performing a group convolution processing on the luminance component (Y) and the chrominance components (U, V) in the YUV space of the image to be processed to obtain content features and style features of the image to be processed; and performing a fusion processing on the content features, the style features and target style features of the image to be processed to convert the image to be processed into an image of a target style.

BRIEF DESCRIPTION OF THE DRAWINGS

The above and/or additional aspects and advantages of the present disclosure will become apparent or easy to understand from the following detailed description taken in conjunction with the accompanying drawings, wherein.

DETAILED DESCRIPTION

Figure 1:
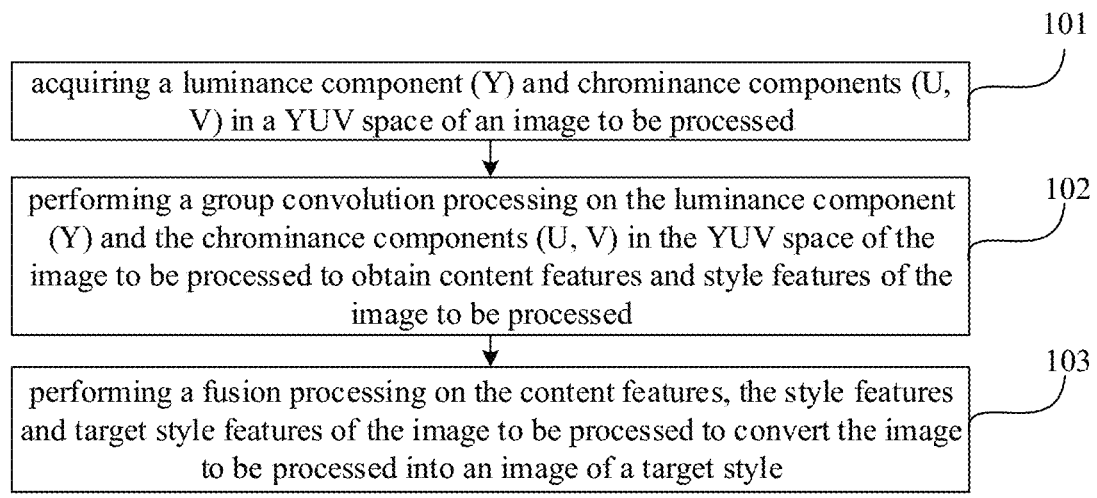
FIG. 1 is a schematic flowchart of a method for converting a style of an image according to exemplary embodiments of the present disclosure.

A detailed description of embodiments of the present disclosure will be given below. Illustrative embodiments are shown in the drawings, in which the similar reference signs are used throughout to represent the same or similar elements or elements having the same or similar functions. The embodiments described with reference to the drawings are illustrative, which are merely used to interpret the present disclosure, but cannot be understood as limitation to the present disclosure.

In view of the problem that there is a need to improve the flexibility and the processing speed of the image processing systems in the related art, a method for converting a style of an image is provided in various embodiments of the present disclosure.

The technical solution disclosed in the present disclosure has the following advantageous effects:

a luminance component (Y) and chrominance components (U, V) in a YUV space of an image to be processed are firstly acquired, and a group convolution processing is performed on the luminance component (Y) and the chrominance components (U, V) in the YUV space of the image to be processed to obtain content features and style features of the image to be processed; and then a fusion process is performed on the content features, the style features and target style features of the image to be processed to convert the image to be processed into an image of a target style. Thus, through performing a group convolution process on different chrominance channels in the YUV space of the image to obtain an image of a target style according to the processing result, the present disclosure not only ensures the integrity of the image data, but also reduces the complexity of image processing, so that the processing speed and the flexibility can be improved, resulting in more efficient image style conversion and better conversion effect.

Additional aspects and advantages of the present disclosure will partly be presented in the following description, partly become apparent in the following description or be appreciated in practicing of the present disclosure.

In the embodiments of the present disclosure, a luminance component (Y) and chrominance components (U, V) in a YUV space of an image to be processed are firstly acquired, and a group convolution processing is performed on the luminance component (Y) and the chrominance components (U, V) in the YUV space of the image to be processed to obtain content features and style features of the image to be processed; and then a fusion process is performed on the content features, the style features and target style features of the image to be processed to convert the image to be processed into an image of a target style. Thus, through performing a group convolution process on different chrominance channels in the YUV space of the image to obtain an image of a target style according to the processing result, the present disclosure not only ensures the integrity of the image data, but also reduces the complexity of image processing, so that the processing speed and the flexibility can be improved, resulting in more efficient image style conversion and better conversion effect.

The method, the apparatus and the device for converting the style of the image according to the embodiments of the present disclosure will be described in detail below with reference to the accompanying drawings.

Firstly, the method for converting the style of the image according to the present disclosure will be specifically described with reference to FIG. 1.

FIG. 1 is a schematic flowchart of the method for converting the style of the image according to exemplary embodiments of the present disclosure.

As shown in FIG. 1, the method for converting the style of the image according to the embodiments of the present disclosure may include the following steps:

Step 101: acquiring a luminance component (Y) and chrominance components (U, V) in a YUV space of an image to be processed.

The method for converting the style of the image provided by the embodiments of the present disclosure can be implemented by a computer device provided by the embodiments of the present disclosure. The computer device is provided with a device for converting the style of the image to control the processing of images. The computer device of the embodiments may be any hardware device having a data processing function, such as a smart phone, a personal digital assistant, a wearable device, a desktop computer, a smart camera, or the like.

In the embodiments, the image to be processed may be an image captured by a camera; or it may be an image acquired from the Internet; or it may be an image stored locally in the computer device, which is not specifically limited herein.

The following embodiment is specifically described by taking an example in which the image to be processed is an image captured by a camera.

For example, image data of an image to be processed can be acquired from an image sensor. For example, the acquired image data may be RGB data in an array of the Beyer, or may be data of other types, such as in the format of the YUV, the YCbCr, or the like, which is not specifically limited herein.

In practical applications, image data is usually RGB data, that is, three components of red, green and blue colors are stored together in a matrix for an image. Moreover, the luminance signal (Y), the chrominance signal (U), and the chrominance signal (V) in the format of the YUV are separated signals, and the structural information (for example, content features, style features) of an image is mostly obtained from the Y-channel component.

Therefore, after the image data of the image to be processed has been acquired, the image data type of the image to be processed is determined in the embodiments to determine whether the image data of the image to be processed is in the format of the YUV. If the image data of the image to be processed is in the format of the YUV, no further processing is required; if the image data of the image to be processed is in the format of the RGB, the image data of the image to be processed needs to be converted into the format of the YUV.

As an exemplary implementation manner, the conversion from RGB data to the format of the YUV in the embodiments can be implemented by formula (1):

$$\begin{cases} Y = -0.299R + 0.587G + 0.114B \\ U = -0.147R - 0.289G + 0.436B \\ V = 0.615R - 0.515G - 0.100B \end{cases} \quad (1)$$

The above conversion formula (1) can also be expressed by the following coding matrix:

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.100 \end{bmatrix} \begin{bmatrix} R \\ G \\ B \end{bmatrix}$$

Further, after the image data in the format of the YUV of the image to be processed has been acquired, the computer device can obtain a luminance component (Y) and chrominance components (U, V) in the YUV space of the image to be processed. That is, the luminance component of the image to be processed is obtained from the Y channel, a chrominance component of the image to be processed is obtained from the U channel, and another chrominance component of the image to be processed is obtained from the V channel.

Step 102: performing a group convolution processing on the luminance component (Y) and the chrominance components (U, V) in the YUV space of the image to be processed to obtain content features and style features of the image to be processed.

Figure 2:
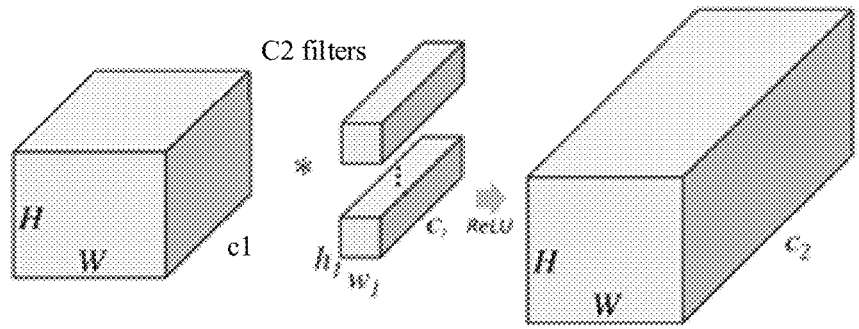
FIG. 2 is a schematic diagram of performing a convolution processing on an image by a conventional convolutional neural network in the related art.

As shown in FIG. 2, at present, when a convolution process is performed on an image in the related art, the convolution processing is generally performed on the data of the image in its entirety, that is, the input data is: H1×W1×C1 and according to FIG. 2, a size of the convolution kernel in the convolution processing is h1×w1, the total number of the convolution kernels is C2, then the output data obtained by convolution is H2×W2×C2 which puts higher demands on the capacity of the memory of the computer device.

Figure 3:
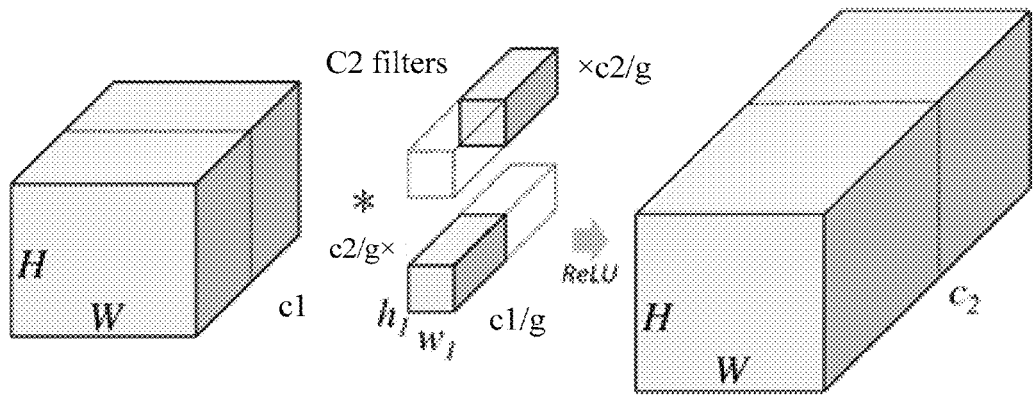
FIG. 3 is a schematic diagram of performing a convolution processing on an image by a group convolutional neural network of the present disclosure.

The embodiments of the present disclosure reduce the network parameters and lower the memory capacity requirement of the computer device by acquiring the luminance component (Y) and the chrominance components (U, V) in the YUV space of the image to be processed and performing a group convolution processing on the luminance component (Y) and the chrominance components (U, V). For example, as shown in FIG. 3, the luminance component (Y) and the chrominance components (U, V) in the YUV space of the image to be processed may be grouped in depth, for example, the input data is divided into two groups, wherein the number of groups is "g". Then, a convolution processing is performed on input data of corresponding groups using convolution kernels of the respective groups to obtain output data, which is then combined by "concatenate", so that the number of channels of the final output data is still C2. That is, after the number of the groups "g" is determined, "g" identical convolution processing will be performed in parallel, the size of the input data of each processing is H1×W1×C1/g, the size of the convolution kernel is h1×w1×C1/g with totally C2/g convolution kernels, and the size of the output data is H2×W2×C2/g.

It should be noted that when the luminance component (Y) and the chrominance components (U, V) in the YUV space of the image to be processed is divided into groups as described above, it depends on C1/g. With a change in the output data, the same change must be made to the corresponding convolution kernels, that is, the depth of the convolution kernel of each group also becomes C1/g.

That is, the present disclosure, by using a group convolutional neural network, performs a convolution processing on the luminance component (Y) and the chrominance components (U, V) in the YUV space of the image to be processed, so that the convolution processing may be performed on different chrominance channels at different layers to obtain content features and style features of the image to be processed. Therefore, the present disclosure nay not only reduce the size of the convolutional network model, but also improve the image processing speed and the flexibility.

For example, in a case of 256 input channels, 256 output channels and the size of a convolution kernel of 3*3, when the processing is performed according to the convolution processing method in related art, the number of network parameters is 256×3×3×256 If the processing is performed by using the group convolution processing method, and if the number of groups is 8, the numbers of the input channels and the output channels of each group are both 32, the number of network parameters is 8×32×3×3×32 Obviously, the number of the network parameters in the group convolution processing is one eighth of that of the conventional convolution processing method, so that the number of network parameters is significantly reduced, and thereby the speed of image processing can be improved.

It should be noted that the processing of generating the group convolutional neural network model of the embodiments will be described in detail below with examples, and will not be detailed herein.

Step 103: performing a fusion processing on the content features, the style features and target style features of the image to be processed to convert the image to be processed into an image of a target style.

The target style features may be any style features different from the style features of the image to be processed, and will not be specifically limited herein. For example, the style features of the image may be soft, vivid, distant, nostalgic, refreshing, quiet, classical, sketch, or the like.

For example, after the content features and the style features of the image to be processed have been acquired, a fusion process may be performed on the content features, the style features and target style features of the image to be processed to convert the image to be processed into an image of a target style.

Figure 4:
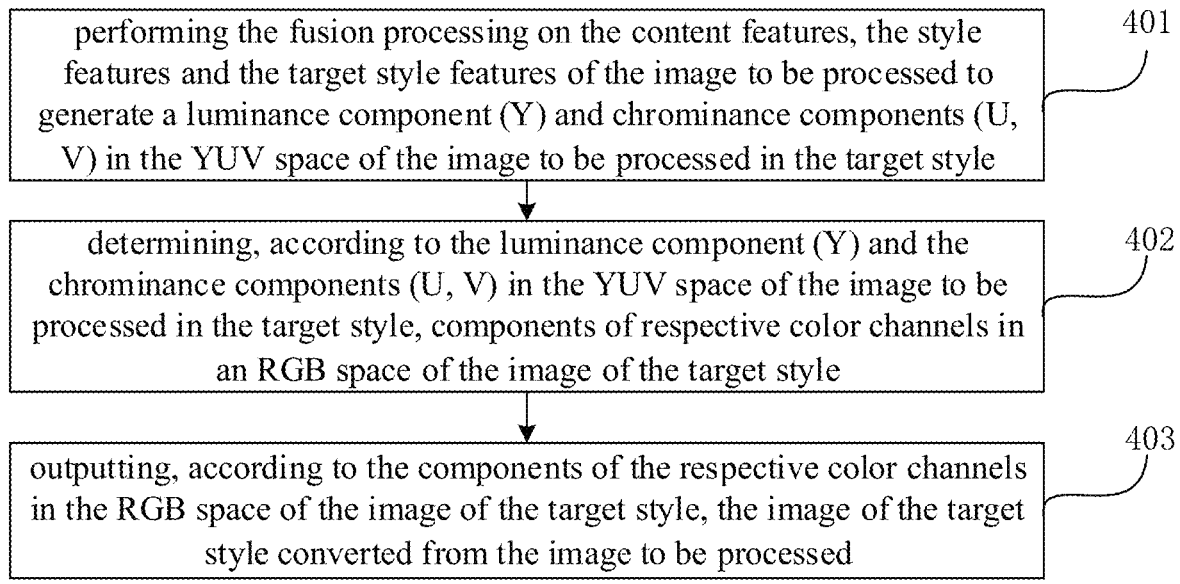
FIG. 4 is a schematic flowchart of performing a fusion processing on content features, style features and target style features of an image to be processed according to the present disclosure.

As an exemplary implementation, as shown in FIG. 4, the fusion process can be performed on the content features, the style features and the target style features of the image to be processed by the following steps.

Step 401: performing the fusion processing on the content features, the style features and the target style features of the image to be processed to generate a luminance component (Y) and chrominance components (U, V) in the YUV space of the image to be processed in the target style.

For example, based on the feature fusion algorithm of the deep learning theory, a fusion process is performed on the content features, the style features and the target style features of the image to be processed to generate a luminance component (Y) and chrominance components (U, V) in the YUV space of the image to be processed in the target style.

Step 402: determining, according to the luminance component (Y) and the chrominance components (U, V) in the YUV space of the image to be processed in the target style, components of respective color channels in an RGB space of the image of the target style;

Step 403: outputting, according to the components of the respective color channels in the RGB space of the image of the target style, the image of the target style converted from the image to be processed.

In the embodiments, the determining of the components of respective color channels in an RGB space of the image of the target style can be implemented by the following conversion formula (2).

$$\begin{cases} R = Y + 1.13983V \\ G = Y - 0.39465U - 0.58060V \\ B = Y + 2.03211U \end{cases} \quad (2)$$

The above conversion formula (2) can also be expressed by the following coding matrix:

$$\begin{bmatrix} R \\ G \\ B \end{bmatrix} = \begin{bmatrix} 1 & 0 & 1.13983 \\ 1 & -0.39465 & -0.58060 \\ 1 & 2.03211 & 0 \end{bmatrix} \begin{bmatrix} Y \\ U \\ V \end{bmatrix}$$

Further, after the components of respective color channels in an RGB space of the image of the target style have been obtained, the image of the target style in the format of the RGB can be synthesized according to the components of respective color channels in the RGB space.

That is, when the image to be processed is converted to the image of the target style, the components of respective chrominance channels in the YUV space of the image to be processed in the target style are firstly generated according to the target style features, then the luminance component (Y) and the chrominance components (U, V) in the YUV space are converted to the components of respective color channels in the RGB space, and then output the image of the target style converted from the image to be processed.

The embodiments of the present disclosure provides the method for converting the style of the image, in which a luminance component (Y) and chrominance components (U, V) in a YUV space of an image to be processed are firstly acquired, and a group convolution processing is performed on the luminance component (Y) and the chrominance components (U, V) in the YUV space of the image to be processed to obtain content features and style features of the image to be processed; and then a fusion process is performed on the content features, the style features and target style features of the image to be processed to convert the image to be processed into an image of a target style. Thus, through performing a group convolution process on different chrominance channels in the YUV space of the image to obtain an image of a target style according to the processing result, the present disclosure not only ensures the integrity of the image data, but also reduces the complexity of image processing, so that the processing speed and the flexibility can be improved, resulting in more efficient image style conversion and better conversion effect.

The processing of generating the group convolutional neural network of the above embodiments of the present disclosure will be described in detail below with reference to FIG. 5.

Figure 5:
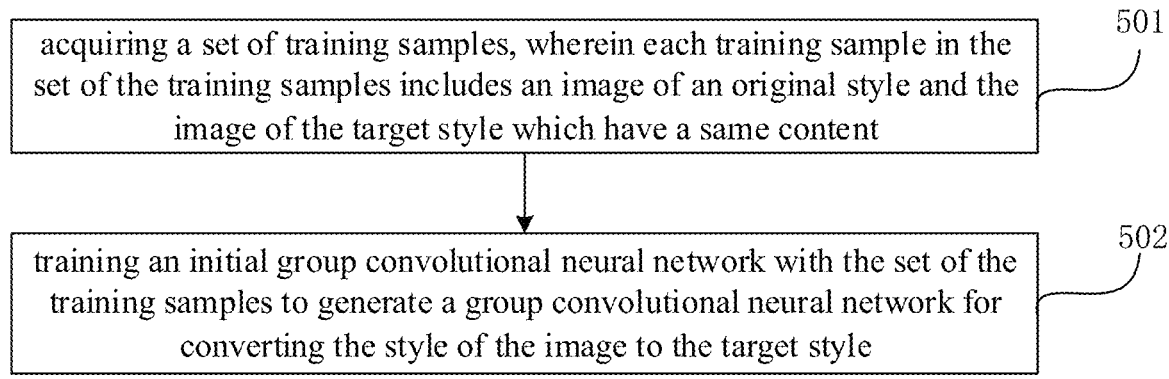
FIG. 5 is a schematic flowchart of generating the group convolutional neural network in the present disclosure.

As shown in FIG. 5, the generating of the group convolutional neural network according to the embodiments of the present disclosure may include the following steps.

Step 501: acquiring a set of training samples, wherein each training sample in the set of the training samples includes an image of an original style and the image of the target style which have a same content.

For example, the set of the training samples can be acquired in the following manners:

Manner 1: acquire from a local memory;

Manner 2: acquire from the Internet.

In order to generate a group convolutional neural network with a high accuracy, the set of the samples can be acquired as much as possible when acquiring the set of the training samples in the embodiments, for example, tens of thousands, millions, tens of millions, or the like.

Step 502: training an initial group convolutional neural network with the set of the training samples to generate a group convolutional neural network for converting the style of the image to the target style.

For example, the initial group convolutional neural network are trained multiple times by using the images of the original style in the acquired set of the training samples as input data input to the initial group convolutional neural network, and using the images of the target style corresponding to the images of the original style as training results, constantly adjusting the weight values of each of the layers in the initial group convolutional neural network, until the trained initial group convolutional neural network, to which an image of the original style is input, can accurately output a corresponding image of the target style. The trained initial group convolutional neural network is then used as the final group convolutional neural network.

It can be understood that, in the embodiments, by acquiring a large number of the sets of the training samples, the initial group convolutional neural network is trained multiple times to generate a final group convolutional neural network, so that the image processing speed and the flexibility can be improved when performing the style conversion on the image to be processed.

Further, after the generation of the group convolutional neural network, the embodiments of the present disclosure can perform a group convolution processing on the luminance component (Y) and the chrominance components (U, V) in the YUV space of the image to be processed by using the group convolutional neural network.

Figure 6:
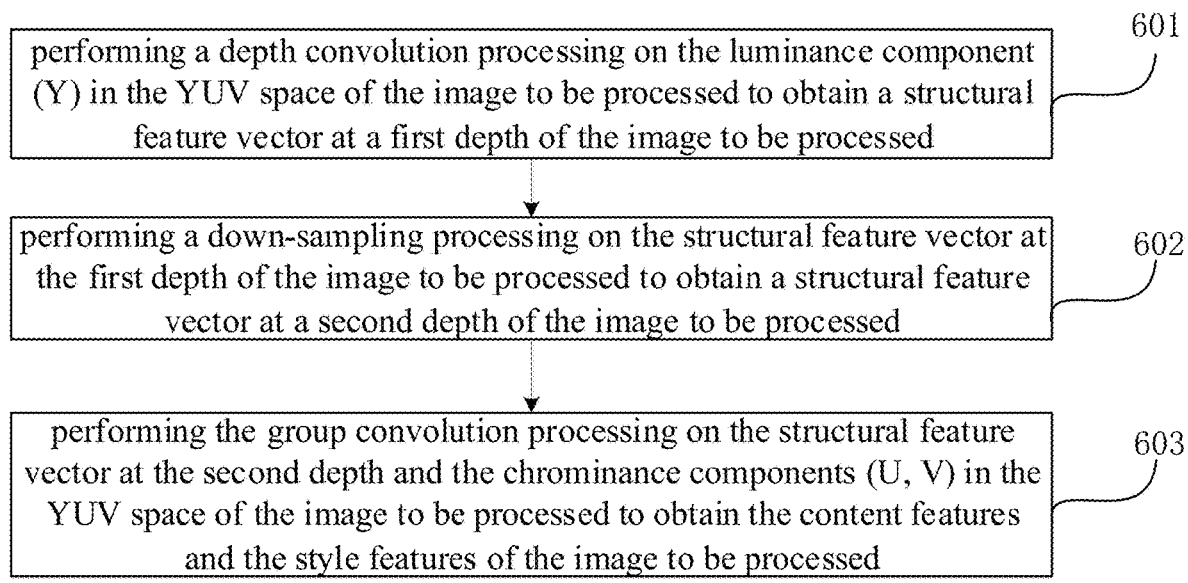
FIG. 6 is a schematic flowchart of performing a group convolution processing on a luminance component (Y) and chrominance components (U, V) of the image to be processed in the present disclosure.

Referring to FIG. 6, the specific processing of performing a group convolution processing on the luminance component (Y) and the chrominance components (U, V) in the YUV space of the image to be processed according to the embodiment of the present disclosure will be described in detail.

Step 601: performing a depth convolution processing on the luminance component (Y) in the YUV space of the image to be processed to obtain a structural feature vector at a first depth of the image to be processed.

Step 602: performing a down-sampling processing on the structural feature vector at the first depth of the image to be processed to obtain a structural feature vector at a second depth of the image to be processed.

Step 603: performing the group convolution processing on the structural feature vector at the second depth and the chrominance components (U, V) in the YUV space of the image to be processed to obtain the content features and the style features of the image to be processed.

Figure 7:
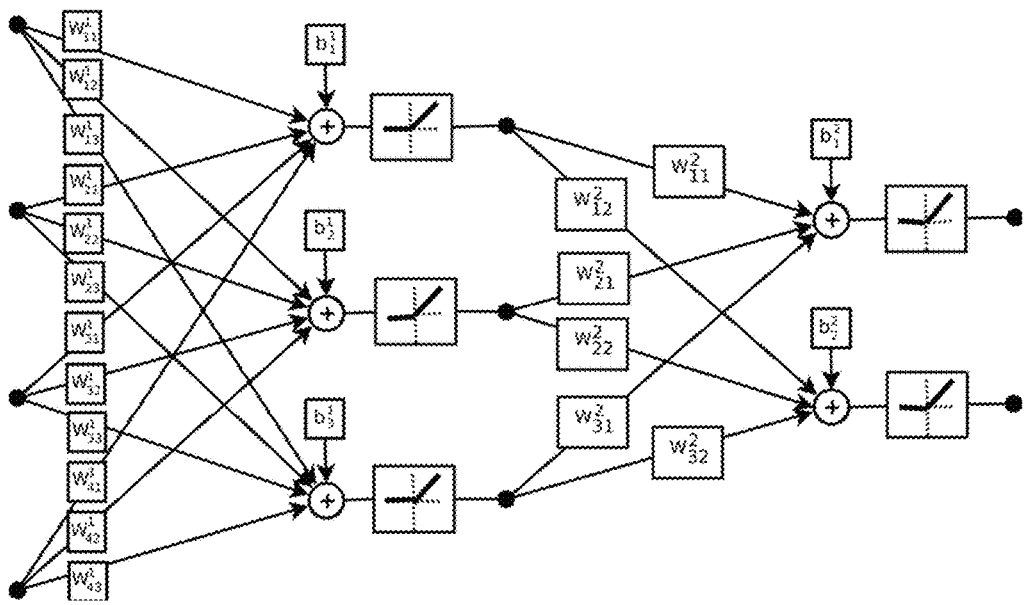
FIG. 7 is a schematic structural diagram of an exemplary convolutional neural network.

In the embodiments, the deep convolutional neural network is a special structure of the neural network, which takes images as the input and the output of the system and replaces weights of the variables with convolution kernels. For example, as shown in FIG. 7, a three-layer convolutional neural network has four inputs, the hidden layer has three outputs, and the output layer has two outputs. The system finally outputs two images. Each block $w_{ij}^k$ represents a convolution kernel, wherein "k" is the input layer number, "i" and "j" are the input and output unit numbers. $b_i^k$ represents offsets, which are a set of scalars superimposed on the output of the convolutional layer, wherein "k" is the input layer number, "i" and "j" are the input and output unit numbers. As shown in FIG. 7, the output of the convolutional layer on which the offsets are superimposed enters the active layer (RELU or sigmoid function). After the convolutional neural network is trained, the convolution kernels and the offsets are fixed. For example, the training of the convolutional neural network is to adjust the parameters of the convolution kernels and the offsets through a set of matched inputs and outputs and an optimization algorithm. Usually, each of the convolutional layers can contain tens or hundreds of convolution kernels, and the deep convolutional neural network often contains more than 5 convolutional layers.

That is, in the present embodiment, by using a deep convolutional neural network, the luminance component in the YUV space of the image to be processed can be input as input data to the deep convolutional neural network, which, after passing through a number of convolutional layers and pooling layers of the deep convolutional neural network, passes through a flatten layer, a fully connected layer and a softmax layer, to derive content features and style features of the image to be processed.

For example, the output of each of the convolutional layers is features extracted from the input image to be processed; the pooling layer reduces the resolution of the feature image and passes it to the next convolutional layer, so that the feature map after each of the convolutional layers represents features of the input image at different levels, such as textures, edges, objects, or the like. After several convolutional layers and pooling layers, the flatten layer converts the feature image into a vector and then passes it to the fully connected layer. Finally, a probability that the image belongs to each of the features is output through the softmax layer, wherein the feature having the highest probability is the final output of the system.

Since the convolutional layers and the pooling layers can be used to obtain features of the image to be processed, the embodiments can intercept the convolutional layers and the pooling layers to acquire content features and style features of the image to be processed.

In actual use, since the pooling layer is a form of down-sampling processing, the embodiments perform down-sampling processing (that is, perform the pooling layer processing) on the structural feature vector of the image to be processed.

In general, the pooling layers that are commonly used include: max-pooling, avg-pooling, decimation, demuxout, or the like.

It can be understood that, in the embodiments, by down-sampling the structural features of the image to be processed, the size of the convolution feature can be reduced, and the processing efficiency can be improved.

In order to more clearly understand the role of each of the layers in the deep convolutional neural network, in addition to the above-mentioned convolutional layer and pooling layer, the flatten layer, the fully connected layer, the Softmax layer, and the Instance Normalization layer will be explained below.

For example, the flatten layer is used to convert a 2D feature image into 1D data, that is, a scalar data, and the 1D data can be output to the fully connected layer. The formula for the flatten layer is as follows:

$$v_k = f_{k[j,k\%j]}$$

wherein, "v" denotes a vector containing k elements, and f denotes a matrix having i rows and j columns.

The fully connected layer has the same structure as the convolutional neural network, except that the convolution kernel is replaced with scalar values.

The Softmax layer is a logic function generator that can compress a K-dimensional vector "z" containing arbitrary real numbers into a K-dimensional vector σ(z). The K-dimensional vector σ(z) containing real numbers in the range (0,1) and the sum of all the elements is 1. The formula for Softmax is as follows:

$$\sigma(z)_j = \frac{e^{z_j}}{\sum_{K=1}^{K} e^{z_k}},$$

j=1, 2, . . . , k

The Instance Normalization layer is used to normalize the feature image output from the convolutional layer. The Instance Normalization normalizes each of the feature images according to the mean and the variance of this feature image itself.

The normalization formula for the Instance Normalization is as follows:

$$y_{tijk} = \frac{x_{tijk} - \mu_{ti}}{\sqrt{\sigma_{ti}^2 + \varepsilon}}, \mu_{ti} = \frac{1}{HW}\sum_{l=1}^{W}\sum_{m=1}^{H} x_{tilm},$$

$$\sigma_{ti}^2 = \frac{1}{HW}\sum_{l=1}^{W}\sum_{m=1}^{H}(x_{tilm} - m\mu_{ti})^2$$

wherein, $x_{tijk}$ is the value of the t-th patch, the i-th feature image, the j-th column, and the k-th row in a set of the feature images outputted for a convolutional layer. $y_{tijk}$ denotes the result of inputting $x_{tijk}$ to the Instance Normalization layer. ε is a small integer for avoiding a denominator of 0.

For example, if the size of the mini-batch is T, the number of features output by a convolutional layer is C, and each of the feature images is a matrix of H rows and W columns, the shape of the feature image is (T, C, W, H).

Further, in actual use, there is a loss function in the neural network, also called a cost function, which is an objective function to optimize the neural network. The processing of training or optimizing the neural network is a processing to minimize the loss function. That is, the smaller the value of the loss function, the closer the value of a corresponding prediction is to the value of a real result.

In the present embodiment, when the deep convolutional neural network is used to perform a style conversion processing on the image to be processed, there is a content loss and a style loss, which will be explained below.

Content loss:

Let $\bar{p}$ and $\bar{x}$ are the image of the original style and the image of the target style respectively, $P^l$ and $F^l$ are the feature images output at the 1-th layer of the deep convolutional neural network respectively, then the content loss is defined as follows:

$$L_{content} = \frac{1}{2C1}\sum_{ij}(F^l_{ij} - P^l_{ij})^2$$

wherein, C1 is a constant used to normalize the result.
Further, the style loss:
Firstly, a Gram matrix is defined.
The Gram matrix is defined as follows:

$$G^l_{ij} = \sum_k F^l_{kj}F^l_{ik}$$

Then let $\vec{a}$ and $\vec{x}$ are the image of the original style and the image of the target style respectively, $A^l$ and $G^l$ are the Gram matrixes output at the 1-th layer of the deep convolutional neural network respectively, then the style loss of the layer is defined as follows:

$$E_l = \frac{1}{4N_l^2M_l^2C2}\sum_{i,j}(G^l_{ij} - A^l_{ij})^2$$

wherein, C2 is a constant used to normalize the result.
Then, the total style loss is:

$$L_{style} = \sum_{l=0}^{L} w_l E_l$$

wherein, $w_1$ is a weight of the style loss of the 1-th layer in the total style loss.

Further, in the deep convolutional neural network, all the convolution kernels and the offsets are parameters that need to be obtained through the system training. The convolution kernels determine how the input image is processed. The offsets determine whether the outputs of the convolution kernels are input to the next layer. Therefore, in the deep convolutional neural network, the offsets can be regarded as "switches" that determines whether the convolution kernels are "on" or "off". For different input images, the system turns on or turns off different convolution kernels to achieve multiple effects.

It is desired in the present disclosure that the offsets have absolute values greater than the convolution kernels, which can achieve the "switches" function more effectively. Therefore, this disclosure defines L1 loss as follows:

Firstly, the mean value of the absolute values of all the convolution kernels of the deep convolutional neural network is calculated:

$$W = \frac{\sum \|w\|}{C_w}$$

wherein, $C_w$ is the number of the convolution kernels in the deep convolutional neural network.

Then, the mean value of the absolute values of all the offsets in the deep convolutional neural network is calculated.

$$B = \frac{\sum \|b\|}{C_b}$$

wherein, $C_b$ is the number of the offsets in the deep convolutional neural network.
Finally, the function for calculating the L1 loss is as follows:

$$L_{L1} = \frac{W}{B+\varepsilon}$$

wherein, $\varepsilon$ is a small integer for avoiding a denominator of 0.

Based on the above content loss, style loss and L1 loss, a total loss of the deep convolutional neural network can be obtained.

The total loss of the system is defined as follows:

$$L_{total} = \alpha L_{content} + \beta L_{style} + \chi L_{L1}$$

wherein, $\alpha$, $\beta$ and $\chi$ are the weights of the content loss, the style loss and the L1 loss in the total loss, respectively.

A processing of an implementation of the method for converting the style of the image according to the present disclosure will be described in detail below with reference to FIG. 8.

Figure 8:
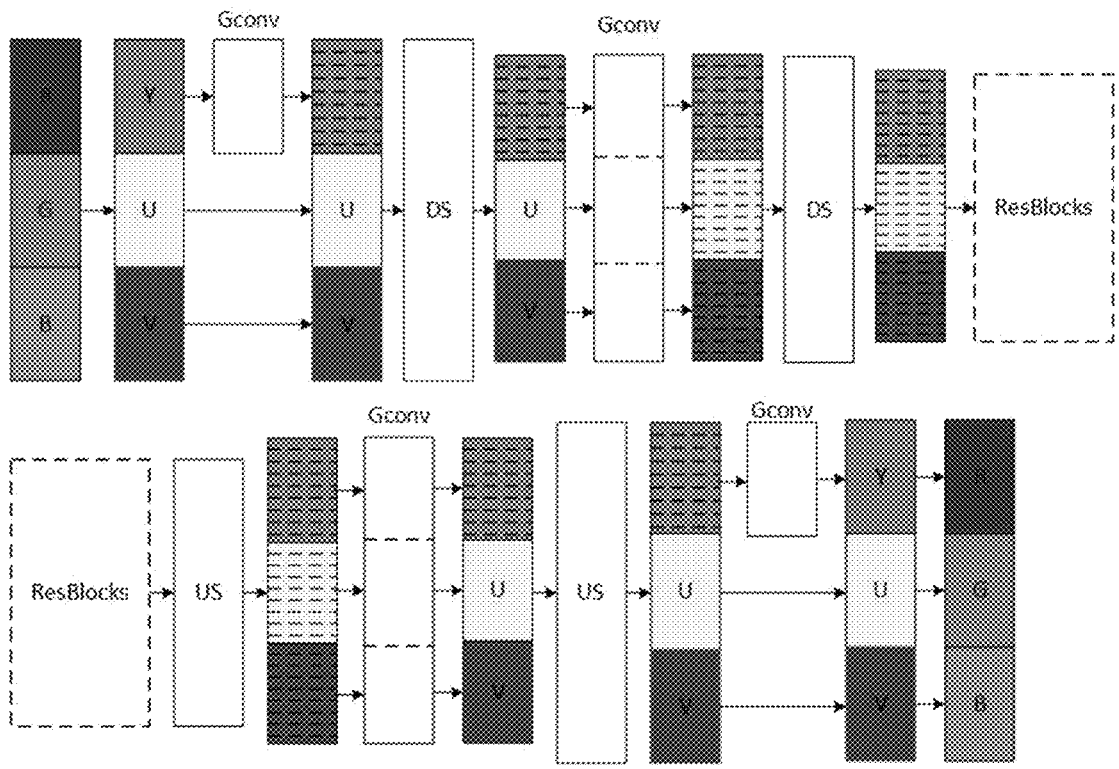
FIG. 8 is a schematic diagram of an exemplary process of converting the style of the image to be processed in the present disclosure.

As shown in FIG. 8, image data of an image to be processed in the format of the RGB is firstly converted into the format of the YUV to obtain the luminance component (Y) and the chrominance components (U, V) in the YUV space, and then the luminance component (Y) and the chrominance components (U, V) in the YUV space are respectively input into different branches, so that the luminance component (Y) and the chrominance components (U, V) are subjected to the processing of several convolutional networks, group convolutional networks, down-sampling layers, and Instance Normalization layers, respectively, to reduce the size of the acquired features. Then, after the processing of a convolutional network including multiple convolutional layers, and passing through the same number of the up-sampling layers, the convolutional layers and the Instance Normalization layers, images of the three channels of the YUV are obtained, and finally the image of the target style is obtained through format conversion and combination. For example, the image data of the image of the target style may be in the format of the RGB.

For example, the above-mentioned up-sampling layer and down-sampling layer can be implemented by using Bicubic layers, MUXER layers, or the like.

According to the above analysis, in the embodiments of the present disclosure, a group convolution processing is performed on the luminance component (Y) and the chrominance components (U, V) in the YUV space of the image to be processed to acquire content features and style features of the image to be processed; then a fusion process is performed on the acquired content features, the style features and target style features to convert the image to be processed into an image of a target style.

In actual use, since the sensitivity of the human eye to chromaticity is less than the sensitivity to brightness, the chrominance component of the image does not need to have the same definition as the luminance component, so lower-definition sampling can be performed on the chrominance channels of the image, which will not significantly degrade the picture quality of the image and can reduce resources occupied by the image. In this regard, in the embodiments, before performing a group convolution processing on the luminance component (Y) and the chrominance components (U, V) in the YUV space of the image to be processed, chrominance sampling can be performed on the components of chrominance channels in the YUV space of the image to be processed to reduce the network parameters and improve the speed of operation. The above content of the method for converting the style of the image according to the present disclosure will be specifically described below with reference to FIG. 9.

Figure 9:
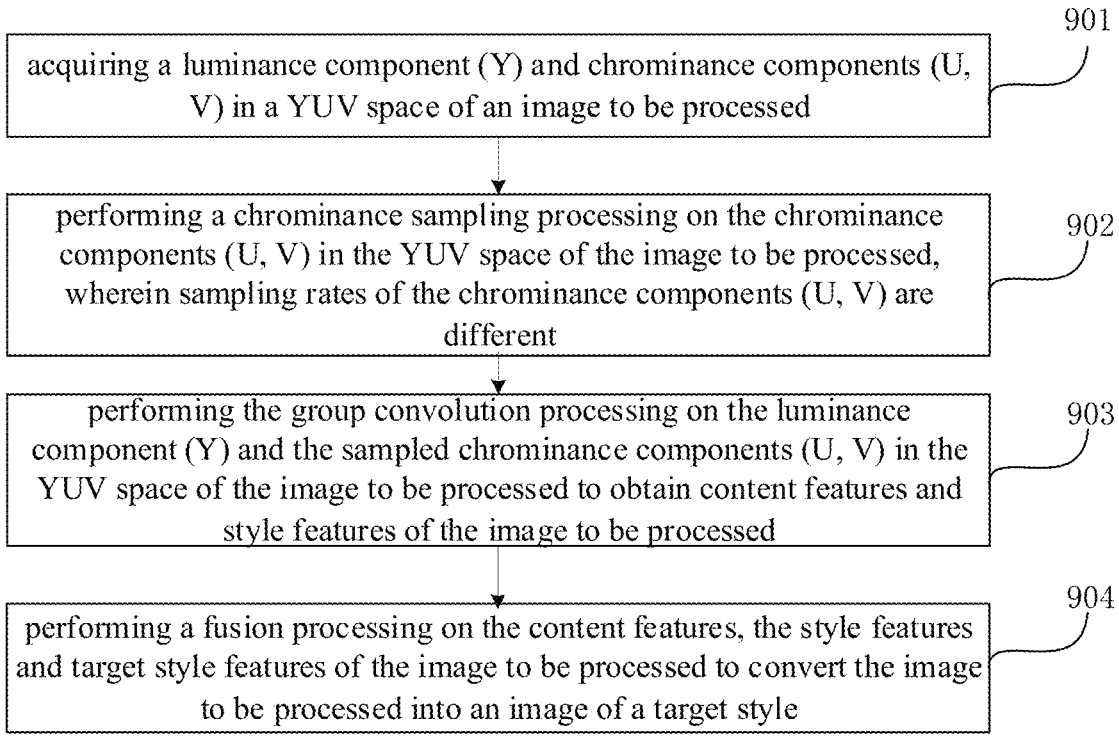
FIG. 9 is a schematic flowchart of a method for converting a style of an image according to exemplary embodiments of the present disclosure.

FIG. 9 is a schematic flowchart of a method for converting a style of an image according to exemplary embodiments of the present disclosure.

As shown in FIG. 9, the method for converting the style of the image according to the embodiments of the present disclosure may include the following steps:

Step 901: acquiring a luminance component (Y) and chrominance components (U, V) in a YUV space of an image to be processed.

Step 902: performing a chrominance sampling processing on the chrominance components (U, V) in the YUV space of the image to be processed, wherein sampling rates of the chrominance components (U, V) are different.

As an exemplary implementation of the present disclosure, in the embodiments, the chrominance sampling process can be performed on the chrominance components (U, V) in the YUV space of the image to be processed according to the format of the YUV420.

YUV420 is directed to each row of information of the image. In each row of pixels, there is only one chrominance component, which is sampled and stored at a frequency of ½, and different chrominance components are processed in adjacent rows.

For example, assume 8 pixels in two rows are as follows:
[Y0 U0 V0] [Y1 U1 V1] [Y2 U2 V2] [Y3 U3 V3]
[Y4 U4 V4] [Y5 U5 V5] [Y6 U6 V6] [Y7 U7 V7]
Then, the pixel information stored or processed is:
Y0U0 Y1 Y2U2 Y3
Y4V4 Y5 Y6V6 Y7
The mapped pixels are as follows:
[Y0 U0 V4] [Y1 U0 V4] [Y2 U2 V6] [Y3 U2 V6]
[Y4 U0 V4] [Y5 U0 V4] [Y6 U2 V7] [Y7 U2 V6]
That is, the 4 adjacent pixels in each row occupy only 6 bytes when being stored or processed, and the amount of data to be processed and stored is greatly reduced than the sampling format of the YUV444.

As an exemplary implementation of the present disclosure, the embodiments may also perform chrominance sampling according to the formats of the YUV422 or the YUV411.

For example, if chrominance sampling is performed according to the format of the YUV422, assume that there are 4 pixels as follows:
[Y0 U0 V0] [Y1 U1 V1] [Y2 U2 V2] [Y3 U3 V3]
then the pixel information stored or processed is:
Y0 U0 Y1 V1 Y2 U2 Y3 V3
The mapped pixels are as follows:
[Y0 U0 V1] [Y1 U0 V1] [Y2 U2 V3] [Y3 U2 V3]
That is, the sampling rate of YUV422 for each chrominance channel is half of that of the luminance channel, and thus the chrominance sampling rate in the horizontal direction is only half of that of YUV444. For an uncompressed 8-bit image, each pixel composed of the two horizontal channels occupy only 4 bytes when being stored or processed, greatly reducing the amount of data to be processed and stored.

Step 903: performing a group convolution processing on the luminance component (Y) and the sampled chrominance components (U, V) in the YUV space of the image to be processed to obtain content features and style features of the image to be processed.

Step 904: performing a fusion processing on the content features, the style features and target style features of the image to be processed to convert the image to be processed into an image of a target style.

The embodiments of the present disclosure provides a method for converting a style of an image, in which the luminance component (Y) and the chrominance components (U, V) in the YUV space of an image to be processed are acquired and a chrominance sampling processing is performed on the chrominance components (U, V) in the YUV space of the image to be processed, and then a group convolution processing is performed on the luminance component (Y) and the chrominance components (U, V) in the YUV space of the image to be processed to acquire content features and style features of the image to be processed; then a fusion processing is performed on the content features, the style features and target style features of the image to be processed to convert the image to be processed into an image of a target style. Thus, through performing a group convolution processing on different chrominance channels in the YUV space of the image to acquire an image of a target style according to the processing result, the present disclosure not only ensures the integrity of the image data, but also reduces the complexity of image processing, so that the processing speed and the flexibility can be improved, resulting in more efficient image style conversion and better conversion effect. Furthermore, the network parameters can be reduced, and the speed of operation can be improved.

In order to implement the above embodiments, the present disclosure further provides an apparatus for converting a style of an image.

Figure 10:
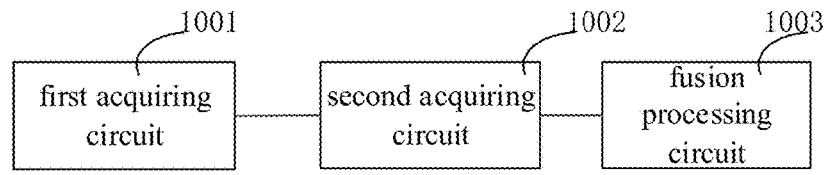
FIG. 10 is a schematic structural diagram of an apparatus for converting a style of an image according to exemplary embodiments of the present disclosure.

FIG. 10 is a schematic structural diagram of an apparatus for converting a style of an image according to exemplary embodiments of the present disclosure.

As shown in FIG. 10, the apparatus for converting the style of the image according to the embodiments of the present disclosure includes: a first acquiring circuit 1001, a second acquiring circuit 1002, and a fusion processing circuit 1003.

The first acquiring circuit 1001 is used for acquiring a luminance component (Y) and chrominance components (U, V) in a YUV space of an image to be processed.

The second acquiring circuit 1002 is used for performing a group convolution processing on the luminance component (Y) and the chrominance components (U, V) in the YUV space of the image to be processed to obtain content features and style features of the image to be processed.

The fusion processing circuit 1003 is used for performing a fusion processing on the content features, the style features and target style features of the image to be processed to convert the image to be processed into an image of a target style.

As an exemplary implementation of the present disclosure, the fusion processing circuit 1003 includes:

a fusion processing sub-circuit for performing the fusion processing on the content features, the style features and the target style features of the image to be processed to generate a luminance component (Y) and chrominance components (U, V) in the YUV space of the image to be processed in the target style;

a determining sub-circuit for determining, according to the luminance component (Y) and the chrominance components (U, V) in the YUV space of the image to be processed in the target style, components of respective color channels in an RGB space of the image of the target style; and an output sub-circuit for outputting, according to the components of the respective color channels in the RGB space of the image of the target style, the image of the target style converted from the image to be processed.

As an exemplary implementation of the present disclosure, the apparatus for converting the style of the image according to the present disclosure further includes: a third acquiring circuit and a training circuit (not shown).

The third acquiring circuit is used for acquiring a set of training samples, wherein each training sample in the set of the training samples includes an image of an original style and the image of the target style which have a same content.

The training circuit is used for training an initial group convolutional neural network with the set of the training samples to generate a group convolutional neural network for converting the style of the image to the target style.

As an exemplary implementation of the present disclosure, the second acquiring circuit 1002 includes:

a first acquiring sub-circuit for performing a depth convolution processing on the luminance component (Y) in the YUV space of the image to be processed to obtain a structural feature vector at a first depth of the image to be processed;

a second acquiring sub-circuit for performing a down-sampling processing on the structural feature vector at the first depth of the image to be processed to obtain a structural feature vector at a second depth of the image to be processed; and a third acquiring sub-circuit for performing the group convolution processing on the structural feature vector at the second depth and the chrominance components (U, V) in the YUV space of the image to be processed to obtain the content features and the style features of the image to be processed.

It should be noted that the foregoing explanation of the embodiments of method for converting the style of the image is also applicable to the apparatus for converting the style of the image according to the embodiments, the implementation principle thereof is similar, and will not be described in detail herein.

The embodiments of the present disclosure provides an apparatus for converting a style of an image, which firstly acquires the luminance component (Y) and the chrominance components (U, V) in the YUV space of an image to be processed and then performs a group convolution processing on the luminance component (Y) and the chrominance components (U, V) in the YUV space of the image to be processed to acquire content features and style features of the image to be processed; then performs a fusion processing on the content features, the style features and target style features of the image to be processed to convert the image to be processed into an image of a target style. Thus, through performing a group convolution processing on different chrominance channels in the YUV space of the image to obtain an image of a target style according to the processing result, the present disclosure not only ensures the integrity of the image data, but also reduces the complexity of image processing, so that the processing speed and the flexibility can be improved, resulting in more efficient image style conversion and better conversion effect.

Figure 11:
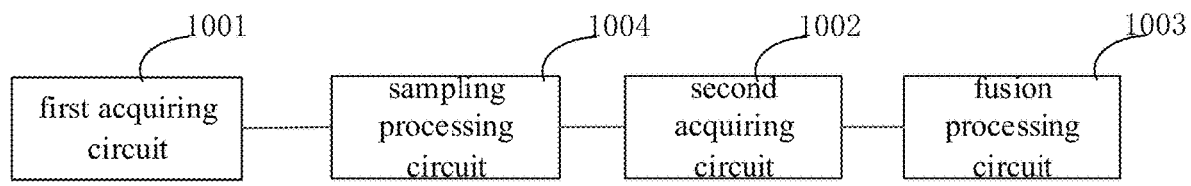
FIG. 11 is a schematic structural diagram of an apparatus for converting a style of an image according to exemplary embodiments of the present disclosure.

FIG. 11 is a schematic structural diagram of an apparatus for converting a style of an image according to exemplary embodiments of the present disclosure.

As shown in FIG. 11, the apparatus for converting the style of the image according to the embodiments of the present disclosure includes: a first acquiring circuit 1001, a second acquiring circuit 1002, a fusion processing circuit 1003, and a sampling processing circuit 1004.

The first acquiring circuit 1001 is used for acquiring a luminance component (Y) and chrominance components (U, V) in a YUV space of an image to be processed.

The second acquiring circuit 1002 is used for performing a group convolution processing on the luminance component (Y) and the sampled chrominance components (U, V) in the YUV space of the image to be processed to obtain content features and style features of the image to be processed.

The fusion processing circuit 1003 is used for performing a fusion processing on the content features, the style features and target style features of the image to be processed to convert the image to be processed into an image of a target style.

As an exemplary implementation of the present disclosure, the sampling processing circuit 1004 is used for performing a chrominance sampling processing on the chrominance components (U, V) in the YUV space of the image to be processed, wherein sampling rates of the chrominance components (U, V) are different.

As an exemplary implementation of the present disclosure, the sampling processing circuit 1004 is specifically used for performing a chrominance sampling processing on the chrominance components (U, V) in the YUV space of the image to be processed according to the format of the YUV420.

It should be noted that, for the implementation and technical principle of the apparatus for converting the style of the image according the embodiments, reference can be made to the method for converting the style of the image according to the foregoing embodiments, which will not be described in detail herein.

The embodiments of the present disclosure provides an apparatus for converting a style of an image, which acquires the luminance component (Y) and the chrominance components (U, V) in the YUV space of an image to be processed and performs a chrominance sampling processing on the chrominance components (U, V) in the YUV space of the image to be processed, and then performs a group convolution processing on the luminance component (Y) and the chrominance components (U, V) in the YUV space of the image to be processed to acquire content features and style features of the image to be processed; then performs a fusion processing on the content features, the style features and target style features of the image to be processed to convert the image to be processed into an image of a target style. Thus, through performing a group convolution processing on different chrominance channels in the YUV space of the image to acquire an image of a target style according to the processing result, the present disclosure not only ensures the integrity of the image data, but also reduces the complexity of image processing, so that the processing speed and the flexibility can be improved, resulting in more efficient image style conversion and better conversion effect. Furthermore, the network parameters can be reduced, and the speed of operation can be improved.

In order to implement the above embodiments, the present disclosure further provides a computer device.

Figure 12:
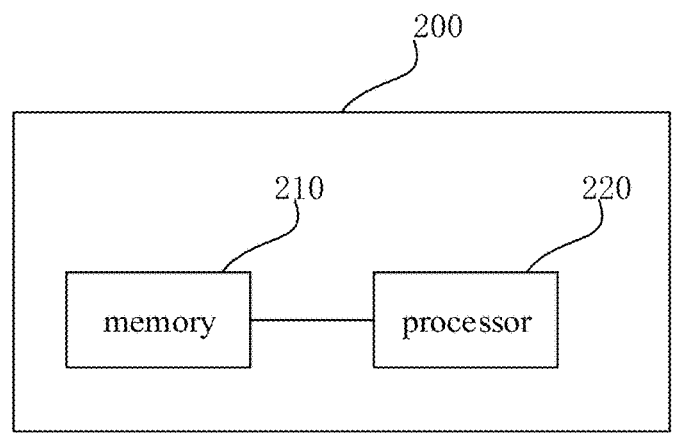
FIG. 12 is a schematic structural diagram of a computer device according to exemplary embodiments of the present disclosure.

FIG. 12 is a schematic structural diagram of a computer device according to exemplary embodiments of the present disclosure. The computer device shown in FIG. 12 is merely an example and should not impose any limitation on the function and scope of the embodiments of the present disclosure.

As shown in FIG. 12, the computer device 200 includes a memory 210, a processor 220, and a computer program stored in the memory 210 and executable on the processor 220, which, when executed by the processor 220, implements the method for converting the style of the image according to the above embodiments of the present disclosure.

Figure 13:
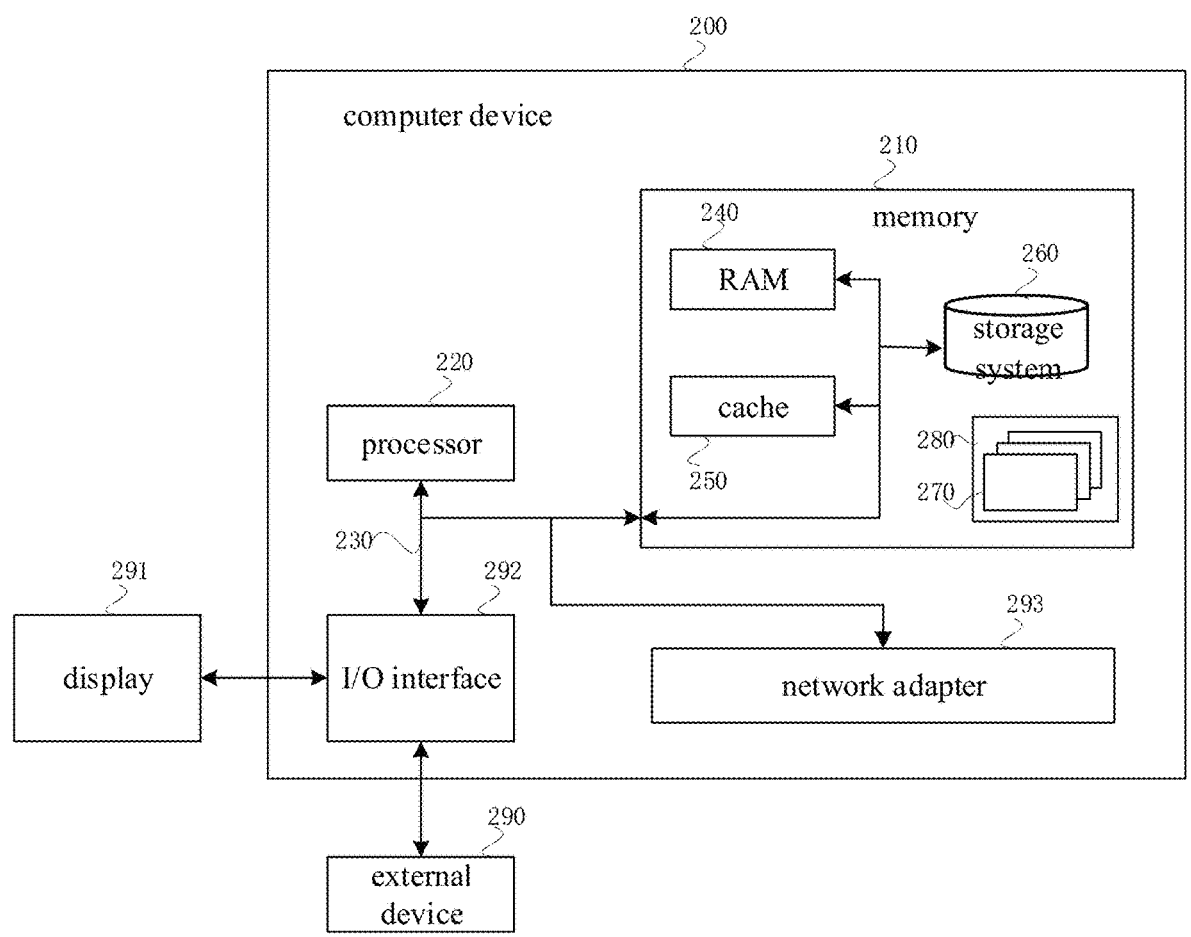
FIG. 13 is a schematic structural diagram of a computer device according to exemplary embodiments of the present disclosure.

In an exemplary implementation, as shown in FIG. 13, the computer device 200 may further include: a memory 210 and a processor 220, and a bus 230 connecting different components (including the memory 210 and the processor 220), a computer program stored on the memory 210, which, when executed by the processor 220, implements the method for converting the style of the image described in the embodiments of the present disclosure.

The bus 230 represents one or more of several types of bus structures, including a memory bus or memory controller, a peripheral bus, a graphics acceleration port, a processor, or a local bus using any of a variety of bus structures. For example, these architectures include, but are not limited to, an Industry Standard Architecture (ISA) bus, a Micro Channel Architecture (MAC) bus, an Enhanced ISA Bus, a Video Electronics Standards Association (VESA) local bus, and peripheral component interconnects (PCI) bus.

The computer device 200 typically includes a variety of computer device readable media. These media can be any available media that can be accessed by computer device 200, including volatile and nonvolatile media, removable and non-removable media.

The memory 210 may also include computer system readable media in the form of volatile memory, such as random access memory (RAM) 240 and/or cache memory 250. The computer device 200 may further include other removable/non-removable, volatile/non-volatile computer system storage media. By way of example, a storage system 260 can be used to read from and write to non-removable, non-volatile magnetic media (not shown in FIG. 13, generally referred to as "hard disk drives"). Although not shown in FIG. 13, a magnetic disk driver for reading from and writing to a removable non-volatile disk (such as a "floppy disk"), and an optical disk driver for reading from and writing to a removable non-volatile optical disk (such as a CD-ROM, DVD-ROM, or other optical media) may be provided. In these cases, each of the drivers can be coupled to the bus 230 via one or more data medium interfaces. The memory 210 can include at least one program product having a set (e.g., at least one) of program modules configured to perform the functions of the various embodiments of the present disclosure.

A program/utility 270, having a set (at least one) of program modules 270, may be stored in the memory 210. The program modules 270 comprises, by way of example, and not limitation, an operating system, one or more application programs, other program modules, and program data. Each of the operating system, one or more application programs, other program modules, and program data or some combination thereof, may include an implementation of a networking environment. The program modules 270 generally carry out the functions and/or methodologies of embodiments of the present disclosure as described herein.

The computer device 200 may also communicate with one or more external devices 290 such as a keyboard, a pointing device, a display 291, or the like; one or more devices that enable a user to interact with the computer device 200; and/or any devices (e.g., a network card, a modem, or the like) that enable the computer device 200 to communicate with one or more other computing devices. Such communication can occur via I/O interfaces 292. Still yet, the computer device 200 can communicate with one or more networks such as a local area network (LAN), a general wide area network (WAN), and/or a public network (e.g., the Internet) via a network adapter 293. As depicted, the network adapter 293 communicates with the other components of the computer device 200 via the bus 230. It should be understood that although not shown, other hardware and/or software components could be used in conjunction with the computer device 200. Examples include, but are not limited to: microcode, device drivers, redundant processing units, external disk drive arrays, RAID systems, tape drives, and data archival storage systems, or the like.

It should be noted that, for the implementation and technical principle of the computer device of this embodiment, reference can be made to the method for converting the style of the image according to the foregoing embodiments, which will not be described in detail herein.

The embodiments of the present disclosure provides a computer device, which firstly acquires the luminance component (Y) and the chrominance components (U, V) in the YUV space of an image to be processed and then performs a group convolution processing on the luminance component (Y) and the chrominance components (U, V) in the YUV space of the image to be processed to acquire content features and style features of the image to be processed; then performs a fusion process on the content features, the style features and target style features of the image to be processed to convert the image to be processed into an image of a target style. Thus, through performing a group convolution processing on different chrominance channels in the YUV space of the image to acquire an image of a target style according to the processing result, the present disclosure not only ensures the integrity of the image data, but also reduces the complexity of image processing, so that the processing speed and the flexibility can be improved, resulting in more efficient image style conversion and better conversion effect.

In order to implement the above purposes, the present disclosure further provides a computer-readable medium.

A computer program is stored on the computer-readable storage medium, which, when executed by a processor, implements the method for converting the style of the image according to the embodiments of the present disclosure.

In an exemplary implementation, the embodiments can employ any combination of one or more computer readable media. The computer readable medium can be a computer readable signal medium or a computer readable storage medium. The computer readable storage medium can be, for example, but not limited to, an electronic, a magnetic, an optical, an electromagnetic, an infrared, or a semiconductor system, apparatus, or device, or any combination of the above. More specific examples (non-exhaustive lists) of computer readable storage media include: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In this document, a computer readable storage medium can be any tangible medium that can contain or store a program, which can be used by or in connection with an instruction execution system, apparatus or device.

A computer readable signal medium may include a data signal that is propagated in the baseband or as part of a carrier, carrying computer readable program codes. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device.

Program codes embodied on a computer readable medium can be transmitted by any suitable medium, including but not limited to wireless, wire, fiber optic cable, RF, or the like, or any suitable combination of the foregoing.

The computer program codes for executing operations of the present disclosure may be complied by any combination of one or more program design languages, the program design languages including object-oriented program design languages, such as Java, Smalltalk, C++, or the like, as well as conventional procedural program design languages, such as "C" program design language or similar program design language. The program codes may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, including local area network (LAN) or wide area network (WAN), or connected to external computer (for example using an internet service provider via Internet).

In order to implement the above purposes, the present disclosure further provides a computer program product comprising instructions. The instructions, when executed by a processor, implements the method for converting the style of the image according to the embodiments of the the present disclosure.

In the present disclosure, unless otherwise explicitly stated and defined, the terms "setting", "connection" and the like should be interpreted broadly, for example, a connection may be a mechanical connection or electrical connection; it may be direct connection or indirect connection through an intermediate medium, and may be internal communication of two elements or an interaction relationship of two elements, unless explicitly defined otherwise. For those of ordinary skill in the art, the specific meanings of the above terms in this disclosure can be interpreted according to particular situations.

In the description of this specification, reference throughout this specification to "one embodiment", "some embodiments", "illustrative embodiments", "examples", "specific examples", or "some examples" means that a particular feature, structure, material or characteristic described in connection with the embodiment is included in at least one embodiment of the present disclosure.

Furthermore, the terms "first" and "second" are used for descriptive purposes only, and are not to be construed as indicating or implying relative importance or implicitly indicating the number of indicated technical features. Thereby, features defined by "first", "second" may expressly or implicitly include one or more of the features.

Any process or method description in the flowcharts or otherwise described herein may be interpreted as representing a module, segment or portion of code that includes one or more executable instructions for implementing the steps of a particular logical function or processing. Moreover, the scope of the preferred embodiments of the present disclosure includes additional implementations, in which the functions may not be performed in the order shown or discussed, including in a substantially simultaneous manner or in an opposite order depending on the functions involved, as understood by those skilled in the art to which the embodiments of the present disclosure belong.

It should be understood that portions of the present disclosure can be implemented in hardware, software, firmware, or a combination thereof. In the above-described embodiments, multiple steps or methods may be implemented in software or firmware stored in a memory and executed by a suitable instruction execution system. For example, if implemented in hardware, as in another embodiment, it can be implemented with any one or a combination of the following technologies, which are each well known in the art: a discrete logic circuit(s) having logic gates for implementing logic functions upon data signals, an application specific integrated circuit having appropriate combinational logic gates, a programmable gate array(s) (PGA), a field programmable gate array (FPGA), or the like.

The common technical personnel in the field can understand that all or some steps in the embodiments can be completed by the means that relevant hardware is instructed by a program, the program can be stored in a computer readable storage medium, and the program comprises any one or combination of the steps in the embodiments when being executed.

The above-mentioned storage medium may be a read only memory, a magnetic disk or an optical disk, or the like. Although embodiments of the present disclosure have been illustrated and described above, it will be understood that the above-described embodiments are exemplary and not to be construed as limiting the present disclosure. Those of ordinary skill in the art may make variations, modifications, substitutions, and variations to the above described embodiments within the scope of the present disclosure.

What is claimed is:

1. A method for converting a style of an image, comprising:
    acquiring a luminance component (Y) and chrominance components (U, V) in a YUV space of an image to be processed;
    performing a group convolution processing on the luminance component (Y) and the chrominance components (U, V) in the YUV space of the image to be processed to obtain content features and style features of the image to be processed; and
    performing a fusion processing on the content features, the style features and target style features of the image to be processed to convert the image to be processed into an image of a target style,
    wherein performing the group convolution processing on the luminance component (Y) and the chrominance components (U, V) in the YUV space of the image to be processed comprises:
    performing a depth convolution processing on the luminance component (Y) in the YUV space of the image to be processed to obtain a structural feature vector at a first depth of the image to be processed;
    performing a down-sampling processing on the structural feature vector at the first depth of the image to be processed to obtain a structural feature vector at a second depth of the image to be processed; and inputting the structural feature vector at the second depth of the image to be processed and the chrominance components (U, V) in the YUV space of the image to be processed as input data to the deep convolutional neural network, which, after passing through a number of convolutional layers and pooling layers of the deep convolutional neural network, passes through a flatten layer, a fully connected layer and a softmax layer, to derive content features and style features of the image to be processed.

2. The method according to claim 1, wherein, before performing the group convolution processing on the luminance component (Y) and the chrominance components (U, V) in the YUV space of the image to be processed, the method further comprises:

performing a chrominance sampling processing on the chrominance components (U, V) in the YUV space of the image to be processed, wherein sampling rates of the chrominance components (U, V) are different.

3. The method according to claim 2, wherein performing the chrominance sampling processing on the chrominance components (U, V) in the YUV space of the image to be processed comprises:

performing the chrominance sampling processing on the chrominance components (U, V) in the YUV space of the image to be processed according to one of formats of YUV420, YUV444, YUV422 or YUV411.

4. The method according to claim 1, wherein performing the fusion processing on the content features, the style features and the target style features of the image to be processed comprises:

performing the fusion processing on the content features, the style features and the target style features of the image to be processed to generate the luminance component (Y) and the chrominance components (U, V) in the YUV space of the image to be processed in the target style;

determining, according to the luminance component (Y) and the chrominance components (U, V) in the YUV space of the image to be processed in the target style, components of respective color channels in an RGB space of the image of the target style; and outputting, according to the components of the respective color channels in the RGB space of the image of the target style, the image of the target style converted from the image to be processed.

5. The method according to claim 1, further comprising:

acquiring a set of training samples, wherein each training sample in the set of training samples includes an image of an original style and the image of the target style which have a same content; and training an initial group convolutional neural network with the set of training samples to generate a group convolutional neural network for converting the style of the image to the target style.

6. An apparatus for converting a style of an image, comprising:

a first acquiring circuit for acquiring a luminance component (Y) and chrominance components (U, V) in a YUV space of an image to be processed;

a second acquiring circuit for performing a group convolution processing on the luminance component (Y) and the chrominance components (U, V) in the YUV space of the image to be processed to obtain content features and style features of the image to be processed; and a fusion processing circuit for performing a fusion processing on the content features, the style features and target style features of the image to be processed to convert the image to be processed into an image of a target style, wherein the second acquiring circuit comprises:

a first acquiring sub-circuit for performing a depth convolution processing on the luminance component (Y) in the YUV space of the image to e processed to obtain a structural feature vector at a first depth of the image to be processed;

a second acquiring sub-circuit for performing a down-sampling processing on the structural feature vector at a first depth of the image to be processed to obtain a structural feature vector at a second depth of the image to be processed; and a third acquiring sub-circuit for inputting the structural feature vector at the second depth of the image to be processed and the chrominance components (U, V) in the YUV space of the image to be processed as input data to the deep convolutional neural network, which, after passing through a number of convolutional layers and pooling layers of the deep convolutional neural network, passes through a flatten layer, a fully connected layer and a softmax layer, to derive content features and style features of the image to be processed.

7. The apparatus according to claim 6, further comprises:

a sampling processing circuit for performing a chrominance sampling processing on the chrominance components (U, V) in the YUV space of the image to be processed, wherein sampling rates of the chrominance components (U, V) are different.

8. The apparatus according to claim 7, wherein the sampling processing circuit performs the chrominance sampling processing on the chrominance components (U, V) in the YUV space of the image to be processed according to one of formats of YUV420, YUV444, YUV422 or YUV411.

9. The apparatus according to claim 6, wherein the fusion processing circuit comprises:

a fusion processing sub-circuit for performing the fusion processing on the content features, the style features and the target style features of the image to be processed to generate the luminance component (Y) and the chrominance components (U, V) in the YUV space of the image to be processed in the target style;

a determining sub-circuit for determining, according to the luminance component (Y) and the chrominance components (U, V) in the YUV space of the image to be processed in the target style, components of respective color channels in an RGB space of the image of the target style; and an outputting sub-circuit for outputting, according to the components of the respective color channels in the RGB space of the image of the target style, the image of the target style converted from the image to be processed.

10. The apparatus according to claim 6, further comprising:

a third acquiring circuit for acquiring a set of training samples, wherein each training sample in the set of training samples includes an image of an original style and the image of the target style which have a same content; and a training circuit for training an initial group convolutional neural network with the set of training samples to generate a group convolutional neural network for converting the style of the image to the target style.

11. A computer device, comprising:
a memory; and
a processor,
wherein the memory is configured to a store computer program executable on the processor, the computer program, when executed by the processor, causes the processor to perform operations of:
acquiring a luminance component (Y) and chrominance components (U, V) in a YUV space of an image to be processed;
performing a group convolution processing on the luminance component (Y) and the chrominance components (U, V) in the YUV space of the image to be processed to obtain content features and style features of the image to be processed; and
performing a fusion processing on the content features, the style features and target style features of the image to be processed to convert the image to be processed into an image of a target style,
wherein performing the group convolution processing on the luminance component (Y) and the chrominance components (U, V) in the YUV space of the image to be processed comprises:
performing a depth convolution processing on the luminance component (Y) in the YUV space of the image to be processed to obtain a structural feature vector at a first depth of the image to be processed;
performing a down-sampling processing on the structural feature vector at the first depth of the image to be processed to obtain a structural feature vector at a second depth of the image to be processed; and
inputting the structural feature vector at the second depth of the image to be processed and the chrominance components (U, V) in the YUV space of the image to be processed as input data to the deep convolutional neural network, which, after passing through a number of convolutional layers and pooling layers of the deep convolutional neural network, passes through a flatten layer, a fully connected layer and a softmax layer, to derive content features and style features of the image to be processed.

12. A non-transitory computer-readable storage medium on which a computer program is stored, wherein the computer program, when executed by a processor, causes the processor to perform operations of:
acquiring a luminance component (Y) and chrominance components (U, V) in a YUV space of an image to be processed;
performing a group convolution processing on the luminance component (Y) and the chrominance components (U, V) in the YUV space of the image to be processed to obtain content features and style features of the image to be processed; and
performing a fusion processing on the content features, the style features and target style features of the image to be processed to convert the image to be processed into an image of a target style,
wherein performing the group convolution processing on the luminance component (Y) and the chrominance components (U, V) in the YUV space of the image to be processed comprises:
performing a depth convolution processing on the luminance component (Y) in the YUV space of the image to be processed to obtain a structural feature vector at a first depth of the image to be processed;
performing a down-sampling processing on the structural feature vector at the first depth of the image to be processed to obtain a structural feature vector at a second depth of the image to be processed; and
inputting the structural feature vector at the second depth of the image to be processed and the chrominance components (U, V) in the YUV space of the image to be processed as input data to the deep convolutional neural network, which, after passing through a number of convolutional layers and pooling layers of the deep convolutional neural network, passes through a flatten layer, a fully connected layer and a softmax layer, to derive content features and style features of the image to be processed.

13. The method according to claim 1, wherein an output of each of the convolutional layers is features extracted from the input image to be processed; the pooling layer performs down-sampling processing on the structural feature vector of the image to be processed to reduce a resolution of a feature image and passes it to a next convolutional layer; the flatten layer converts the feature image into a vector and passes it to the fully connected layer; the softmax layer outputs probability that the image belongs to each feature, wherein the feature having the highest probability is a final output.

14. The method according to claim 1, wherein a total loss of the deep convolutional neural network is obtained by computing a weighted sum of content loss, style loss and L1 loss of the deep convolutional neural network, wherein the L1 loss is calculated by:
calculating a mean value W of absolute values of all convolution kernels of the deep convolutional neural network;
calculating a mean value B of absolute values of all offsets in the deep convolutional neural network; and
calculating the L1 loss based on the following equation $$L_{L1} = \frac{W}{B + \varepsilon}$$

wherein $\varepsilon$ is a small integer for avoiding a denominator of 0.

15. The apparatus according to claim 6, wherein an output of each of the convolutional layers is features extracted from the input image to be processed; the pooling layer performs down-sampling processing on the structural feature vector of the image to be processed to reduce a resolution of a feature image and passes it to a next convolutional layer; the flatten layer converts the feature image into a vector and passes it to the fully connected layer; the softmax layer outputs probability that the image belongs to each feature, wherein the feature having the highest probability is a final output.

16. The apparatus according to claim 6, wherein a total loss of the deep convolutional neural network is obtained by computing a weighted sum of content loss, style loss and L1 loss of the deep convolutional neural network, wherein the L1 loss is calculated by:
calculating a mean value W of absolute values of all convolution kernels of the deep convolutional neural network;

calculating a mean value B of absolute values of all offsets in the deep convolutional neural network; and
calculating the L1 loss based on the following equation $$L_{L1} = \frac{W}{B + \varepsilon}$$

wherein $\varepsilon$ is a small integer for avoiding a denominator of 0.

* * * * *

UNITED STATES PATENT AND TRADEMARK OFFICE
CERTIFICATE OF CORRECTION

PATENT NO. : 10,970,830 B2  
APPLICATION NO. : 16/421923  
DATED : April 6, 2021  
INVENTOR(S) : Lijie Zhang et al.

Page 1 of 1

It is certified that error appears in the above-identified patent and that said Letters Patent is hereby corrected as shown below:

In the Claims

Column 22, Line 9, Claim 6, delete "e" and insert -- be --

Column 22, Line 14, Claim 6, delete "a first" and insert -- the first --

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*